United States Patent [19]
Muir

[11] 3,863,131

[45] Jan. 28, 1975

[54] CHOPPER TRANSISTOR DRIVER AND FEEDBACK CIRCUIT FOR REGULATED DC TO DC POWER CONVERTERS USING SEPARATE INPUT AND OUTPUT GROUNDS

[75] Inventor: Malcolm D. Muir, Amherst, N.H.

[73] Assignee: The United States of America as represented by the Secretary of the Air Force, Washington, D.C.

[22] Filed: Sept. 6, 1973

[21] Appl. No.: 394,892

[52] U.S. Cl. .................................. 321/2, 321/12
[51] Int. Cl. ............................................ H02p 13/22
[58] Field of Search ................. 321/2, 11, 12, 18

[56] References Cited
UNITED STATES PATENTS

| | | |
|---|---|---|
| 3,388,309 | 6/1968 | Banks et al. ............................ 321/2 |
| 3,490,027 | 1/1970 | Galetto et al. ......................... 321/2 |
| 3,660,750 | 5/1972 | Businelli ................................ 321/2 |
| 3,701,937 | 10/1972 | Combs .................................. 321/2 |

OTHER PUBLICATIONS

IEE, "Practical Design Problems in Transistor DC/DC Convertors and DC/AC Inverters," Paper No. 2984E, pp. 1373, 1374, Apr. 1960.

Primary Examiner—William H. Beha, Jr.
Attorney, Agent, or Firm—Harry A. Herbert, Jr.; William Stepanishen

[57] ABSTRACT

A transistorized chopper driver and feedback circuit apparatus having separate input and output grounds for providing a regulated D.C. to D.C. power converter apparatus. The chopper driver and feedback circuit utilizes a master square wave oscillator which has a transformer-coupled output to supply both polarities of the same output wave referenced to both grounds. A feedback circuit is utilized to drive the main chopper transistors with a feedback signal derived from the output voltage of the power converter.

3 Claims, 5 Drawing Figures

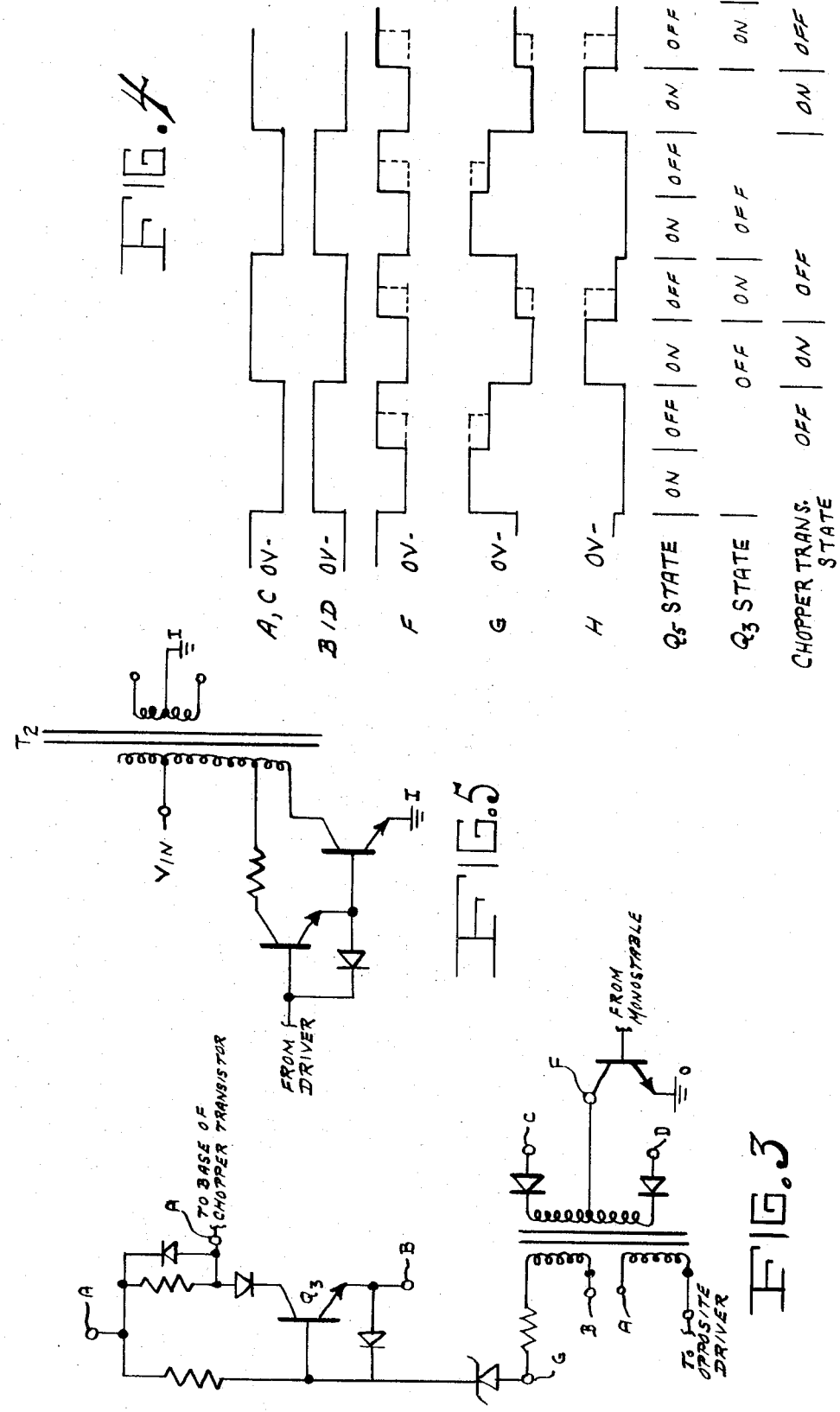

3,863,131

CHOPPER TRANSISTOR DRIVER AND FEEDBACK CIRCUIT FOR REGULATED DC TO DC POWER CONVERTERS USING SEPARATE INPUT AND OUTPUT GROUNDS

BACKGROUND OF THE INVENTION

The present invention relates broadly to a regulated D.C. to D.C. power converter apparatus and in particular to a transistorized chopper driver and feedback having separate input and output ground references.

In the prior art there is need for a switching type regulated D.C. to D.C. voltage converter. Any equipment which is powered by a D.C. source such as a battery and uses other voltages different than the D.C. source supply often must be isolated from the power return. Circuits which are utilized in space electronic, low light level television and various other applications requiring D.C. to D.C. power conversion require isolation or separate ground returns. The currently available D.C. to D.C. converters which have separate grounds use a separate winding on the main transformer that is referenced to input ground as a feedback pick off and use relatively complex circuits as drivers.

Generally, the driver stage is either capacitively coupled to the chopper or a negative D.C. supply voltage must be generated on the input ground side. The present invention provides a simple means for driving the main chopper transistors. It utilizes a feedback signal which is derived from the output voltage in a converter with separate input and output grounds. It provides extremely good regulation by sensing the output voltage after the output filter. Since the introduction of integrated circuitry which must be operated near its breakdown voltage, good regulation has become an important design requirement.

SUMMARY

The present invention is comprised substantially of four main parts, the master oscillator, the chopper drivers, the power choppers and the feedback control circuit. The master square wave oscillator utilizes a transformer-coupled output to supply both polarities of the same output wave which is referenced to both grounds. The chopper drivers are transistor switches which are connected between both polarities of the master oscillator output. However, only one chopper can be on during one phase of the square wave and only when the transistor switch is off. The power chopper is a standard type circuit which comprise a center-tapped transformer, two chopper transistors, output full-wave rectifiers and an inductive input filter. The feedback control circuit comprises a difference amplifier which compares the output voltage to the reference voltage controlling a voltage variable monostable multivibrator. The multivibrator is triggered by each edge of the square wave output from the oscillator.

It is one object of the invention, therefore, to provide an improved chopper transistor driver and feedback circuit apparatus for a regulated D.C. to D.C. power converter having separate input and output grounds.

It is another object of the invention to provide an improved chopper transistor driver and feedback circuit apparatus having extremely good regulation by sensing the output voltage after the output filter.

It is yet another object of the invention to provide an improved chopper transistor driver and feedback circuit apparatus wherein no single component failure can cause both chopper transistors to be driven on at the same time.

It is still another object of the invention to provide an improved chopper transistor driver and feedback circuit apparatus having a reduction in cost, size, weight and in test time.

These and other advantages, objects and features of the invention will become more apparent from the following detailed description when taken in conjunction with the illustrative embodiment in the accompanying drawings.

BRIEF DESCRIPTION OF THE DRAWINGS

FIG. 3 is a schematic diagram of an alternate driver and feedback transformer circuit configuration, FIG. 4 is a graphic representation of the waveforms of FIG. 3, and, FIG. 5 is a schematic diagram of a Darlington circuit which may be utilized for the chopper transistor drivers of FIG. 1.

DETAILED DESCRIPTION OF THE PREFERRED EMBODIMENT

Figure 1:
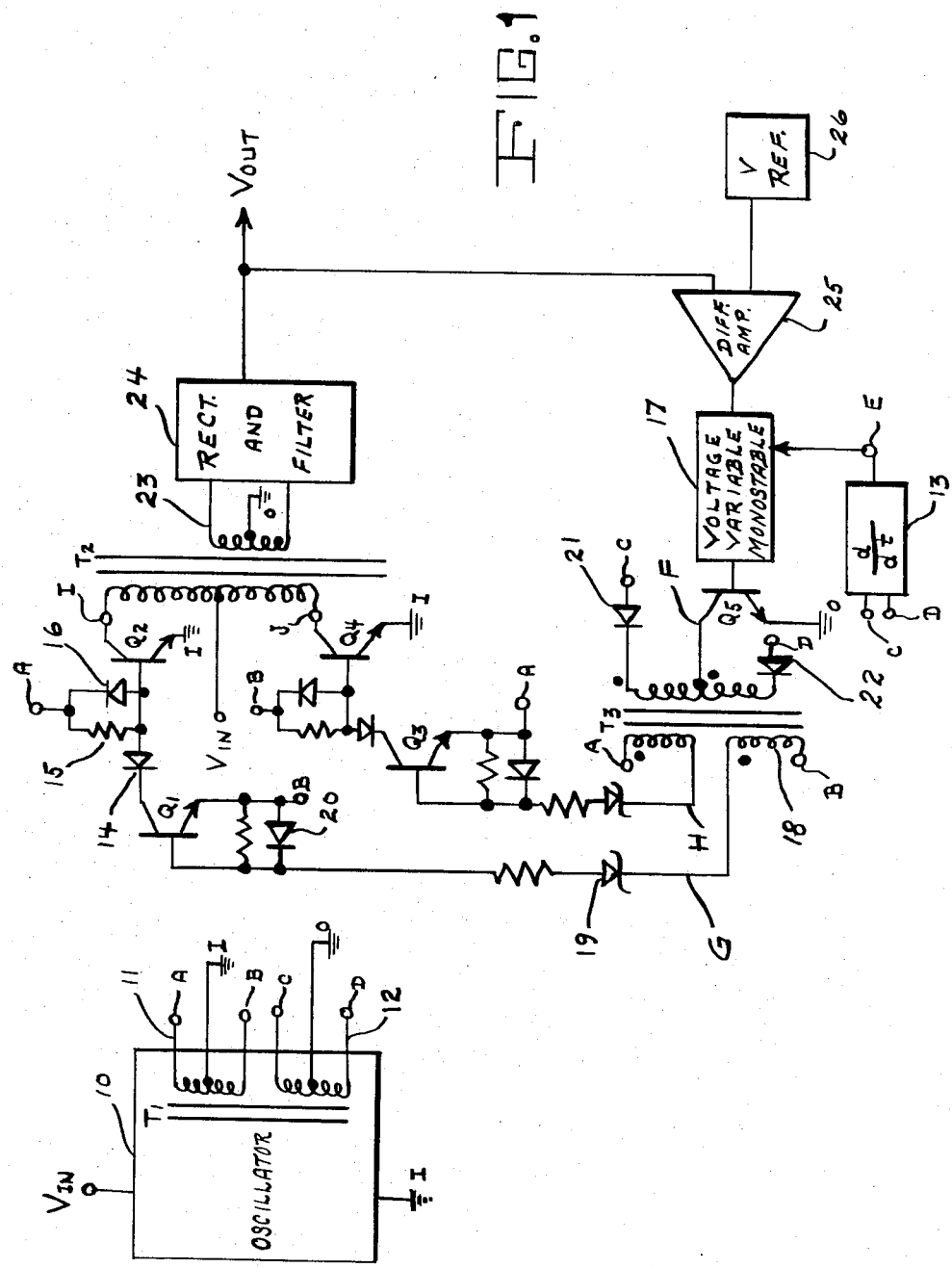
FIG. 1 is a schematic diagram of the chopper transistor driver and feedback circuit in accordance with this invention.

Referring now to FIG. 1, there is shown a chopper transistor driver and feedback circuit apparatus for a regulated D.C. to D.C. power converter utilizing a master oscillator 10 to provide a square wave output signal. The master oscillator 10 is a square wave oscillator with a transformer coupled output. An example of a typical circuit which may be utilized for master oscillator 10 is a magnetically coupled multivibrator circuit. The output transformer T1 has two center-tapped output windings 11, 12. The center tap of output winding 11 is connected to input ground, I. The center tap of output winding 12 is connected to output ground, O. The output winding 11 has a pair of output terminals A,B which are connected to similarly designated points or terminals in the chopper driver and feedback circuit. The output winding 12 also has a pair of terminals C,D which are connected to similarly designated points or terminals in the present circuit. The master oscillator 10 provides its output signal to the chopper circuit and thus determines the frequency at which the chopper operates. It may be noted that, if excessive ringing or spikes are present or occur on output terminals A through D of output windings 11, 12, despiking networks may be needed to protect the chopper circuit transistors. Specifically, excessive ringing or spikes may subject transistors Q2, Q4 to $V_{EBO}$ overstress and cause false triggering in the differentiator 13.

The operation of the chopper drivers and the main chopper circuitry may be better understood by the explanation in the following example. Consider the operation of the main chopper transistor Q2 when it is being driven. The transistor Q2 can be on only when the signal on terminal A is positive and the transistor Q1 is in the off condition. The transistor Q1 is in the off condition when transistor Q5 is lin the off condition. Transistor Q1 which is driven by transistor Q5 is turned on when transistor Q5 is turned on and the signal on terminal C is positive. The diode 14 prevents any current from flowing into the base of transistor Q2 when the signal on terminal B is positive. The resistor 15 and diode 16 are utilized to insure that transistor Q2 is biased off during the interval that terminal B is positive. Resistor 15 also supplies drive to the power chopper transistor Q2. The use of diode 16 is optional. However, it is recommended that diode 16 be used. If the input signal, Vin, to transformer T2 is very low, the monostable multivibrator 17 may not time out. Thus, the transistor Q5 may remain off. Therefore, the diode 16 provides a path for the rapid discharge of the excess charge in the base of the transistor Q2 thereby reducing the storage time in transistor Q2. The transistor Q1 is controlled by a winding 18 on transformer T3. One end of winding 18 is connected to terminal B on output winding 11 in master oscillator 10. The other end of winding 18 is connected to the base of transistor Q1 to provide an input signal. When the output at terminal C of output winding 12 is positive and transistor Q5 is in the on state, the node G is positive with respect to terminal B. Terminal B of output winding 12 is also connected to the emitter of transistor Q1 and provides an emitter reference for transistor Q1. Under these conditions, transistor Q1 will be turned on. The use of diode 19 between the base of transistor Q1 and winding 18 serves to increase the noise immunity in the circuit. The diode 20 is utilized to protect transistor Q1 from VEBO overstresses. Both diodes 19, 20 may be optional in the present circuit. However, their use does increase circuit integrity.

Figure 2:
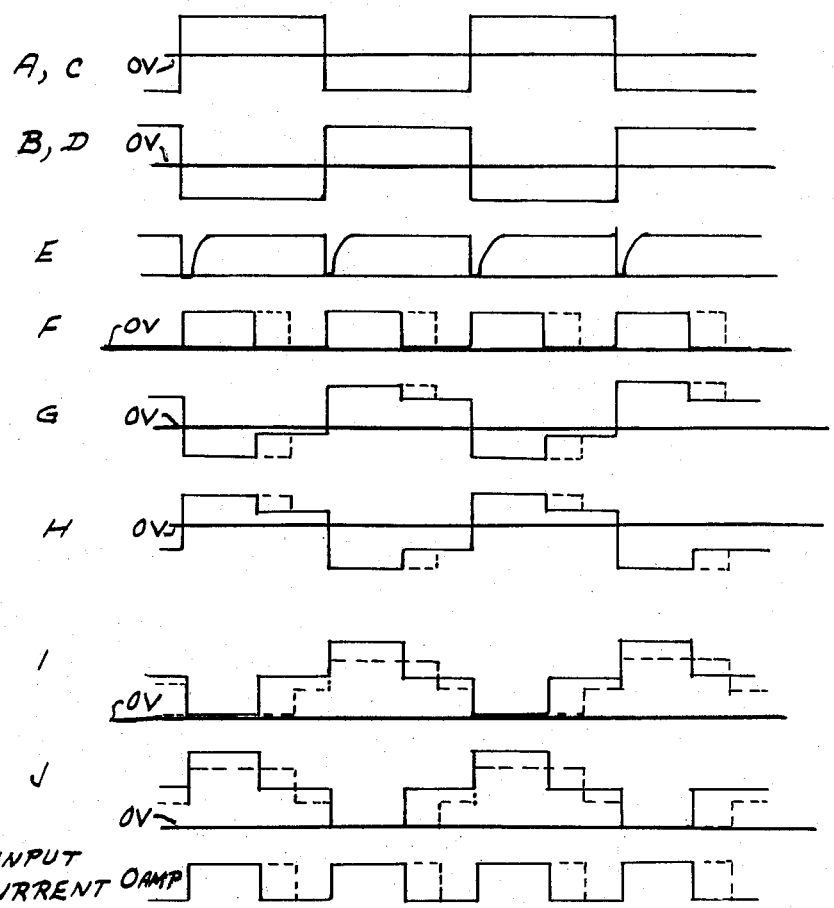
FIG. 2 is a graphic representation of the waveforms at different points in the circuit of FIG. 1.

The diodes 21, 22 permit current only from the positive phase of the square waves from terminals C and D to supply current to transistor Q5. Thus, any interaction between the two phases is eliminated. The present method of driving the chopper circuit insures that the drive to transformer T3 is symmetrical around zero volts. It also insures that the transformer T3 is not required to pass any frequency lower than the frequency of the master oscillator. The waveforms which appear at the various points in FIG. 1 and designated therein by captial letters are shown in FIG. 2 and corresponding characters. These waveforms help provide a better understanding of the circuit operation in FIG. 1 by presenting the various circuit conditions which are necessary to drive the chopper transistors alternately. At this point it should be noted that the operation of only half of the complete chopper and driver circuits were described. The other half of the chopper and driver circuit is comprised of transistors Q3, Q4 and the diodes and resistors associated with them. The circuit operation of transistors Q3 and Q4 is identical to that of the transistors Q1 and Q2 except that transistor Q3 and Q4 are operated on the opposite phase of the master oscillator 10 outputs.

The main chopper circuit is a conventional design comprising a transformer T2 with a center-tapped primary and a chopper transistor Q2, Q4 in each primary leg as shown in FIG. 1. The input voltage, Vin, to the chopper transistor driver and feedback circuit apparatus is applied to the center tap of transformer T2. The secondary winding 23 of transformer T2 is also center-tapped. The center tap of the secondary winding 23 is connected to output ground, O. The secondary winding 23 drives a full wave rectifier circuit 24 which is followed by an inductive input filter. The full wave rectifier is utilized to provide proper commutation of the output signal in the inductor.

There is shown in FIG. 3 an alternate driver and feedback transformer which may be utilized in the present invention. In all but very low power converters it may be desirable to utilize a Darlington circuit configuration shown in FIG. 5 for the main chopper transistors. Again, the driver circuit illustrated, depicts only one half of the complete driver circuit. However, the other half of the driver circuit is identical to the half that is shown except it is connected to a terminal A on transformer T3 and operates on the opposite phase. In the alternate approach for the driver circuit, the polarity connections for transistor Q5 have been reversed. Thus, the main chopper transistor is on when transistor Q5 is on. The waveforms for this circuit are shown in FIG. 4.

The feedback control circuit comprises a differential amplifier 25, a voltage reference source 26, a voltage variable monostable multivibrator 17 and a differentiator circuit 13. The output voltage is directly proportional to the duty cycle of the main chopper transistors Q2, Q4. Therefore, the output voltage is also directly proportional to the precentage of the time that transistor Q5 is in the off state. The transistor Q5 is controlled by a monostable multivibrator 17 which is triggered by the output signal from the master oscillator 10. This is accomplished in the following manner. The output signal from master oscillator 10 which appears on terminals C, D is applied to the differentiator circuit 13. The input signal to the differentiator circuit 13 is a square wave. The output signal from the differentiator circuit 13 is a peaked wave or pulse output. The output pulses are shown in FIG. 2 and are labeled waveform E. The output pulses E from the differentiator circuit 13 trigger the monostable multivibrator 17. The period of the monostable multivibrator 17 is controlled by the output of the difference circuit 25. The difference circuit 25 compares the output voltage, Vout, against a reference voltage source 26 and provides an output signal proportional to the difference therebetween. The voltage reference source 26 may be any of the presently available conventional type devices for this purpose such as Zener diode.

Although the invention has been described with reference to a particular embodiment, it will be understood to those skilled in the art that the invention is capable of a variety of alternative embodiments within the spirit and scope of the appended claims.

I claim:

1. A chopper transistor driver and feedback circuit apparatus for regulated D.C. to D.C. power converters using separate input and output grounds comprising in combination:

a master oscillator to provide a first and second output waveform, said first output waveform comprising a first and second square wave of oppposite polarity, said second output waveform having a third and fourth square wave of opposite polarity, said first and second square wave being referenced to input ground, said third and fourth square wave being referenced to output ground, chopper drivers receiving said first and second output waveforms, said chopper drivers providing a first and second chopper output signal in accordance with the polarity of the said received first and second output waveforms.

a power chopper circuit receiving said first and second chopper output signal, said power chopper circuit receiving an input voltage signal, said power chopper circuit being referenced to input ground, said power chopper circuit providing a chopped output signal, said chopped output signal being referenced to output ground, said chopped signal being applied to a rectifier and filter circuit, said rectifier and filter circuit providing an output voltage signal, and a feedback control circuit receiving a portion of said output signal, said feedback control circuit applying a control signal to said chopper drivers, said control signal establishing the duty cycle of said power chopper circuit.

2. A chopper transistor driver and feedback circuit apparatus as described in claim 1 wherein said chopper driver comprises in combination:

a pair of transistor switches arranged to respectively receive said first and second output waveforms, one of said pair of transistor switches being in the one state, the other one of said pair of transistor switches being in the off state at the same instant in time, said pair of transistor switches alternating their on/off states with respect to said received first and second output waveform, said pair of transistors both being in the off state during the time said feedback control signal establishes the duty cycle of said power chopper circuit.

3. A chopper transistor driver and feedback circuit apparatus as described in claim 1 wherein said feedback control circuit comprises in combination:

a difference amplifier receiving a portion of said output signal, said difference amplifier comparing said output signal to a voltage reference source, said difference amplifier providing a difference voltage output signal, a monostable multivibrator receiving said difference voltage output signal, said monostable multivibrator being voltage variable, and, a differentiator circuit receiving said second differentiator circuit providing a triggering signal, said triggering signal triggering said monostable multivibrator, said monostable multivibrator providing a control signal to said chopper drivers.

* * * * *